(12) United States Patent
Hattori et al.

(10) Patent No.: US 9,254,627 B2
(45) Date of Patent: Feb. 9, 2016

(54) MANUFACTURING METHOD FOR TRANSPARENT SUBSTRATE

(75) Inventors: Daisuke Hattori, Ibaraki (JP); Takeshi Murashige, Ibaraki (JP); Tadayuki Kameyama, Ibaraki (JP)

(73) Assignee: NITTO DENKO CORPORATION, Ibaraki-shi (JP)

( * ) Notice: Subject to any disclaimer, the term of this patent is extended or adjusted under 35 U.S.C. 154(b) by 359 days.

(21) Appl. No.: 13/640,444

(22) PCT Filed: Apr. 28, 2011

(86) PCT No.: PCT/JP2011/060367
§ 371 (c)(1),
(2), (4) Date: Oct. 10, 2012

(87) PCT Pub. No.: WO2011/136327
PCT Pub. Date: Nov. 3, 2011

(65) Prior Publication Data
US 2013/0032277 A1 Feb. 7, 2013

(30) Foreign Application Priority Data

Apr. 30, 2010 (JP) .................. 2010-105140
Nov. 11, 2010 (JP) .................. 2010-252704

(51) Int. Cl.
*B44C 1/17* (2006.01)
*B32B 17/06* (2006.01)
(Continued)

(52) U.S. Cl.
CPC ............. *B32B 17/064* (2013.01); *B29C 65/482* (2013.01); *B29C 66/45* (2013.01);
(Continued)

(58) Field of Classification Search
CPC ........... B05D 1/286; B32B 27/00; C09J 5/00; C09J 7/02
USPC .................................. 156/231, 325
See application file for complete search history.

(56) References Cited

U.S. PATENT DOCUMENTS 5,629,052 A 5/1997 Trokhan et al.
5,817,377 A 10/1998 Trokhan et al.
(Continued)

FOREIGN PATENT DOCUMENTS

CN 1341083 A 3/2002
CN 1481306 A 3/2004
(Continued)

OTHER PUBLICATIONS

International Search Report for PCT/JP2011/060367, mailing date of Jul. 5, 2011.
(Continued)

*Primary Examiner* — Joseph S Del Sole
*Assistant Examiner* — John Robitaille
(74) *Attorney, Agent, or Firm* — Westerman, Hattori, Daniels & Adrian, LLP (57) ABSTRACT

There is provided a manufacturing method for a transparent substrate excellent in bending property, flexibility, impact resistance, and external appearance. A manufacturing method for a transparent substrate according to an embodiment of the present invention includes: a step A of applying a thermoplastic resin (A) composition solution onto a support backing having solvent permeability to form an applied layer; a step B of attaching at least one surface of an inorganic glass and the applied layer to each other via an adhesive composition to form a laminate; a step C of subjecting the laminate to a first heat treatment to reduce an amount of a solvent remaining in the applied layer to a predetermined amount; and a step D including peeling the support backing from the laminate and subjecting the resultant to a second heat treatment to dry the applied layer, thereby forming a thermoplastic resin layer.

13 Claims, 1 Drawing Sheet

(51) Int. Cl.
| | |
|---|---|
| *B32B 7/06* | (2006.01) |
| *B32B 17/10* | (2006.01) |
| *B29C 65/00* | (2006.01) |
| *B32B 38/00* | (2006.01) |
| *G02F 1/1333* | (2006.01) |
| *B32B 7/12* | (2006.01) |
| *B29L 9/00* | (2006.01) |
| *B29L 7/00* | (2006.01) |
| *B29C 65/48* | (2006.01) |
| *B29L 31/34* | (2006.01) |
| *B32B 37/00* | (2006.01) |
| *B32B 37/12* | (2006.01) |
| *B32B 38/10* | (2006.01) |
| *B32B 38/16* | (2006.01) |

(52) U.S. Cl.
CPC ......... *B29C66/7392* (2013.01); *B29C 66/7465* (2013.01); *B29C 66/83421* (2013.01); *B29C 66/83423* (2013.01); *B29C 66/91431* (2013.01); *B29C 66/91645* (2013.01); *B29C 66/91921* (2013.01); *B29C 66/944* (2013.01); *B29C 66/949* (2013.01); *B32B 7/06* (2013.01); *B32B 7/12* (2013.01); *B32B 17/10174* (2013.01); *B32B 38/0036* (2013.01); *G02F 1/133305* (2013.01); *B29C 65/485* (2013.01); *B29C 65/4835* (2013.01); *B29C 66/7315* (2013.01); *B29C 66/73111* (2013.01); *B29C 66/73161* (2013.01); *B29K 2995/0072* (2013.01); *B29K 2995/0089* (2013.01); *B29L 2007/002* (2013.01); *B29L 2009/005* (2013.01); *B29L 2031/3475* (2013.01); *B32B 37/0007* (2013.01); *B32B 37/12* (2013.01); *B32B 38/10* (2013.01); *B32B 2038/168* (2013.01); *B32B 2250/02* (2013.01); *B32B 2250/03* (2013.01); *B32B 2250/40* (2013.01); *B32B 2307/412* (2013.01); *B32B 2307/538* (2013.01); *B32B 2307/558* (2013.01); *B32B 2307/72* (2013.01); *B32B 2309/02* (2013.01); *B32B 2309/105* (2013.01); *B32B 2315/08* (2013.01); *B32B 2367/00* (2013.01); *B32B 2398/20* (2013.01); *B32B 2457/12* (2013.01); *B32B 2457/20* (2013.01)

(56) References Cited

U.S. PATENT DOCUMENTS

| | | | |
|---|---|---|---|
| 6,592,969 | B1 | 7/2003 | Burroughes et al. |
| 6,815,070 | B1 | 11/2004 | Burkle et al. |
| 6,853,123 | B1 | 2/2005 | Nattermann et al. |
| 6,994,906 | B2 | 2/2006 | Burroughes et al. |
| 7,005,794 | B2 | 2/2006 | Watanabe et al. |
| 7,060,241 | B2 | 6/2006 | Glatkowski |
| 7,514,866 | B2 | 4/2009 | Burroughes et al. |
| 7,582,339 | B2 | 9/2009 | Kim et al. |
| 7,604,863 | B2 | 10/2009 | Yamauchi et al. |
| 8,158,229 | B2 | 4/2012 | Clieve |
| 8,241,735 | B2 | 8/2012 | Murashige et al. |
| 8,435,598 | B2 | 5/2013 | Itou |
| 8,440,117 | B2 | 5/2013 | Kim et al. |
| 8,801,978 | B2 | 8/2014 | Kim et al. |
| 2003/0122111 | A1 | 7/2003 | Glatkowski |
| 2003/0124341 | A1 | 7/2003 | Burroughes et al. |
| 2004/0048023 | A1 | 3/2004 | Clieve |
| 2005/0077826 | A1 | 4/2005 | Watanabe et al. |
| 2006/0060825 | A1 | 3/2006 | Glatkowski |
| 2006/0105117 | A1 | 5/2006 | Kim et al. |
| 2006/0134394 | A1 | 6/2006 | Burroughes et al. |
| 2007/0057400 | A1 | 3/2007 | Kung et al. |
| 2008/0081194 | A1 | 4/2008 | Yamauchi et al. |
| 2009/0025834 | A1 | 1/2009 | Poon et al. |
| 2009/0290103 | A1 | 11/2009 | Itou |
| 2009/0295000 | A1 | 12/2009 | Kim et al. |
| 2010/0062234 | A1 | 3/2010 | Murashige et al. |
| 2011/0026236 | A1 | 2/2011 | Kondo et al. |
| 2011/0114160 | A1 | 5/2011 | Murashige et al. |
| 2011/0244225 | A1 | 10/2011 | Hattori et al. |
| 2013/0334718 | A1 | 12/2013 | Kim et al. |

FOREIGN PATENT DOCUMENTS

| | | |
|---|---|---|
| CN | 1639757 A | 7/2005 |
| CN | 101157524 A | 4/2008 |
| CN | 101579959 A | 11/2009 |
| EP | 0 809 732 B1 | 11/2001 |
| EP | 2 273 476 A1 | 1/2011 |
| EP | 2 363 383 A1 | 7/2011 |
| JP | 61-252161 A | 11/1986 |
| JP | 10279329 A | 10/1998 |
| JP | 11-329715 A | 11/1999 |
| JP | 2004-273594 A | 9/2004 |
| JP | 2007-010834 A | 1/2007 |
| JP | 2007199616 A | 8/2007 |
| JP | 2008-107510 A | 5/2008 |
| JP | 2009-282509 A | 12/2009 |
| JP | 2009279929 A | 12/2009 |
| JP | 2011138768 | 7/2011 |
| TW | 200613370 A | 5/2006 |
| TW | 200920769 A | 5/2009 |
| TW | 200943427 A | 10/2009 |
| TW | 200946624 A1 | 11/2009 |
| TW | 201000309 A | 1/2010 |
| WO | D958334 A2 | 11/1999 |
| WO | 00/41978 A1 | 7/2000 |
| WO | 00/42635 A1 | 7/2000 |
| WO | 00/66507 A1 | 11/2000 |
| WO | 2006/052116 A1 | 5/2006 |
| WO | 2009/131073 A1 | 10/2009 |

OTHER PUBLICATIONS

Japanese Office Action dated Jun. 4, 2014, issued in corresponding Japanese Patent Application No. 2010-252704, w/English translation (8 page).

Taiwanese Office Action dated May 1, 2014, issued in corresponding Taiwanese Patent Application No. 100115238, w/ English translation (8 pages).

Extended European Search Report dated May 15, 2014, issued in corresponding European Patent Application No. 11775108.1 (6 pages).

Chinese Office Action dated Jul. 25, 2014, issued in corresponding Chinese Patent Application No. 201180021854.2, w/English translation (12 pages).

Office Action dated Apr. 8, 2015, issued in corresponding Japanese Patent Application No. 2014-157589, with English translation (6 pages).

Office Action dated May 13, 2015, issued in corresponding U.S. Appl. No. 14/542,138 (5 pages).

Extened European Search Report dated Jun. 30, 2015, issued in counterpart application No. 14197914.6 (8 pages).

Taiwanese Office Action dated Oct. 8, 2015, issued in counterpart Taiwanese patent application No. 103126680 with English translation. (9 pages).

Japanese Office Action dated Oct. 28, 2015 issued in counterpart Japanese patent application No. 2014-157589 with English translation, (8 pages).

MANUFACTURING METHOD FOR TRANSPARENT SUBSTRATE

TECHNICAL FIELD

The present invention relates to a manufacturing method for a transparent substrate.

BACKGROUND ART

In recent years, reductions in weight and thickness of each of a display apparatus such as a flat panel display (FPD: a liquid crystal display apparatus or an organic EL display apparatus, for example) and a solar cell have been advanced through development of a visual communication technology. A glass substrate has hitherto been used as a substrate for use in each of the display apparatus and the solar cell in many cases. The glass substrate is excellent in transparency, solvent resistance, gas barrier property, and heat resistance. However, when one attempts to reduce the thickness of glass for forming the glass substrate, the glass substrate is reduced in weight and simultaneously exhibits excellent flexibility, but there arises a problem in that the glass substrate becomes difficult to handle because of its insufficient impact resistance.

In order to improve handling property of a thin glass substrate, there have been proposed a flexible substrate obtained by applying a resin solution onto a glass surface, followed by drying (see, for example, Patent Documents 1 and 2) and a flexible substrate including a resin film attached to a glass surface (see, for example, Patent Literature 3). However, even in the case of using any of those technologies, a flexible substrate satisfying sufficient impact resistance in a manufacturing step of a display device which requires high reliability under high temperature and high humidity has not been obtained yet.

Further, the flexible substrate obtained by applying a resin solution onto a glass surface, followed by drying, has a problem in that the resin solution foams during the applying step and the drying step, resulting in deterioration in external appearance. Meanwhile, the flexible substrate including a resin film attached to a glass surface has a problem in that a stress, which is necessary for enhancing impact resistance of glass, is not sufficiently applied to glass, and hence sufficient impact resistance cannot be obtained. In addition, when a resin solution or a solvent is used as an adhesive for attaching the resin film, a wrinkle is liable to occur in the film. The wrinkle in the film not only causes a problem in an external appearance of a flexible substrate but also causes a problem in that the film ruptures when a measure for preventing the occurrence of the wrinkle is taken.

PRIOR ART DOCUMENTS

Patent Document

[PTL 1] JP 11-329715 A
[PTL 2] JP 2008-107510 A
[PTL 3] JP 2007-010834 A

SUMMARY OF INVENTION

Problem to be Solved by the Invention

The present invention has been made in order to solve the conventional problems. An object of the present invention is to provide a manufacturing method for a transparent substrate excellent in bending property, flexibility, impact resistance, and external appearance.

Means for Solving the Problems

A manufacturing method for a transparent substrate according to an embodiment of the present invention includes: a step A of applying a thermoplastic resin (A) composition solution onto a support backing having solvent permeability to form an applied layer; a step B of attaching at least one surface of an inorganic glass and the applied layer to each other via an adhesive composition to form a laminate; a step C of subjecting the laminate to a first heat treatment to reduce an amount of a solvent remaining in the applied layer to a predetermined amount; and a step D including peeling the support backing from the laminate and subjecting the resultant to a second heat treatment to dry the applied layer, thereby forming a thermoplastic resin layer.

In a preferred embodiment of the invention, the amount of the solvent in the applied layer during the applied layer is formed is 7 wt % or more.

In a preferred embodiment of the invention, the first heat treatment reduces the amount of the solvent remaining in the applied layer to 15 wt % or less.

In a preferred embodiment of the invention, a shrinkage stress of the applied layer upon peeling the support backing is 10 MPa or less.

In a preferred embodiment of the invention, a stress to be applied to the inorganic glass after the second heat treatment is 10 MPa to 30 MPa.

In a preferred embodiment of the invention, a temperature of the first heat treatment is, with respect to a boiling point $(bp_A)$ of a solvent contained in a largest amount in the thermoplastic resin (A) composition solution, $(bp_A-60)°$ C. to $(bp_A+40)°$ C.

In a preferred embodiment of the invention, a temperature of the second heat treatment is, with respect to a boiling point $(bp_A)$ of a solvent contained in a largest amount in the thermoplastic resin (A) composition solution, $(bp_A-20)°$ C. to 250° C.

In a preferred embodiment of the invention, the adhesive composition comprises a solvent, and a boiling point of the solvent in the adhesive layer is equal to or higher than a boiling point of a solvent contained in the thermoplastic resin (A) composition solution.

In a preferred embodiment of the invention, the adhesive composition comprises a solvent, and the solvent in the adhesive layer exhibits property of dissolving a thermoplastic resin (A) contained in the thermoplastic resin (A) composition solution.

In a preferred embodiment of the invention, the adhesive composition comprises a component exhibiting compatibility with a thermoplastic resin (A) contained in the thermoplastic resin (A) composition solution.

In a preferred embodiment of the invention, the adhesive composition comprises a solvent, a thermoplastic resin (B) exhibiting compatibility with the thermoplastic resin (A) composition solution, a thermosetting monomer, and a curing reaction catalyst.

In a preferred embodiment of the invention, the thermoplastic resin (B) has a reaction group at a terminal.

In a preferred embodiment of the invention, a storage elastic modulus at 90° C. of the support backing is $1.0 \times 10^7$ Pa or more.

In a preferred embodiment of the invention, a thickness of the inorganic glass is 100 μm or less.

Advantageous Effects of Invention

According to the present invention, it is possible to provide the transparent substrate excellent in bending property, flexibility, impact resistance, and external appearance, including an inorganic glass to which a stress is sufficiently applied and a thermoplastic resin layer whose foaming is suppressed, by attaching an applied layer containing a solvent (i.e., an applied layer in a semi-dried state) formed on a support backing having solvent permeability and an inorganic glass to each other via an adhesive composition to form a laminate, subjecting the laminate to a heat treatment to reduce the amount of a solvent remaining in the applied layer to a predetermined amount, peeling the support backing from the laminate, and subjecting the resultant to a heat treatment again to dry the applied layer.

DESCRIPTION OF EMBODIMENTS

Figure 1:
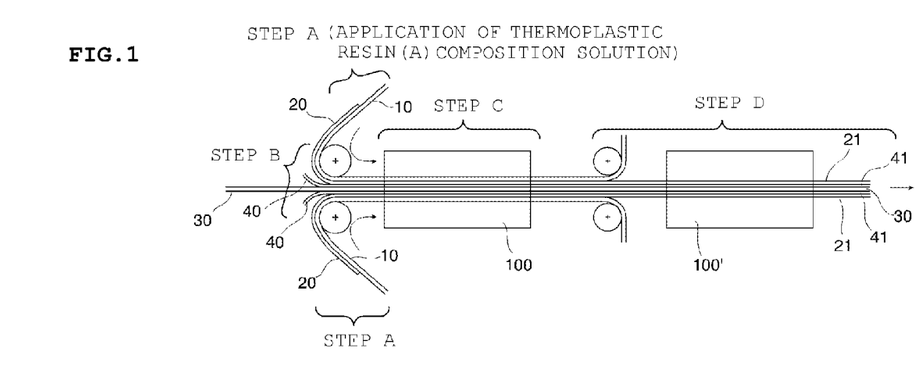
FIG. 1 A schematic view schematically illustrating a manufacturing method for a transparent substrate according to a preferred embodiment of the present invention.

FIG. 1 is a schematic view schematically illustrating a manufacturing method for a transparent substrate according to a preferred embodiment of the present invention. The manufacturing method of the present invention includes: a step A of applying a thermoplastic resin (A) composition solution onto a support backing 10 to form an applied layer 20; a step B of attaching at least one surface of an inorganic glass 30 (both surfaces of the inorganic glass 30 in an example illustrated in the figure) and the applied layer 20 to each other via an adhesive composition 40 to form a laminate; a step C of subjecting the laminate to a first heat treatment to reduce the amount of a solvent remaining in the applied layer to a predetermined amount; and a step D including peeling the support backing 10 from the laminate and subjecting the resultant to a second heat treatment to dry the applied layer 20, thereby forming a thermoplastic resin layer 21. In the manufacturing method of the present invention, the applied layer 20 contains a solvent and thus is in a semi-dried state during the step A to the step C, and in the subsequent step, i.e., the step D, the thermoplastic resin layer 21 is formed after the completion of the drying of the solvent, in a state in which the support backing 10 is peeled off. According to the manufacturing method of the present invention, there can be provided a transparent substrate including the inorganic glass 30, an adhesive layer 41 obtained by drying the adhesive composition 40, and the thermoplastic resin layer 21 obtained by drying the applied layer 20 containing a thermoplastic resin (A).

Figure 2:
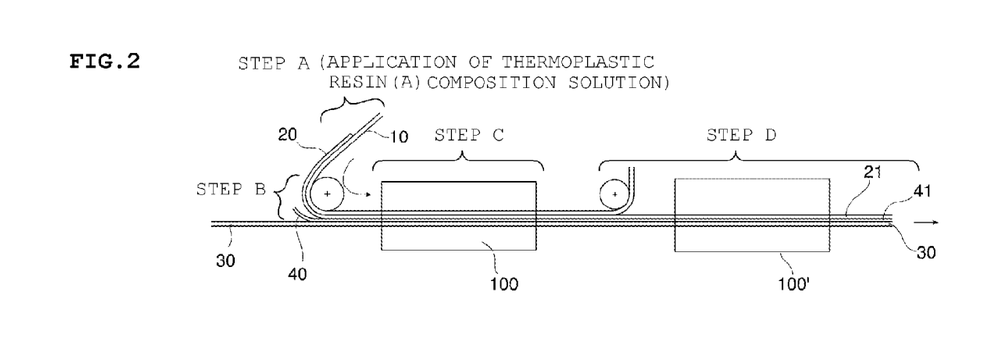
FIG. 2 A schematic view schematically illustrating a manufacturing method for a transparent substrate according to another preferred embodiment of the present invention.

FIG. 2 is a schematic view schematically illustrating a manufacturing method for a transparent substrate according to another preferred embodiment of the present invention. FIG. 2 illustrates an embodiment in the case of attaching one surface of the inorganic glass 30 and the applied layer 20 to each other via the adhesive composition 40.

A. Step A

The step A is a step of applying a thermoplastic resin (A) composition solution onto a support backing to form an applied layer.

The support backing preferably has solvent resistance with respect to a solvent in the thermoplastic resin (A) composition solution and a solvent contained in an adhesive composition to be described later. A constituent material for such support backing is exemplified by polyethylene terephthalate (PET) and polyethylene naphthalate (PEN).

The support backing has solvent permeability. The support backing preferably has solvent permeability with respect to a solvent in the thermoplastic resin (A) composition solution. The support backing more preferably has solvent permeability with respect to a solvent in the thermoplastic resin (A) composition solution and a solvent contained in an adhesive composition to be described later. The use of such support backing allows the applied layer to be prevented from foaming during the first heat treatment, because a solvent permeates the support backing when the first heat treatment is carried out to volatilize the solvent in a downstream step (step C). A constituent material for such support backing is exemplified by polyethylene terephthalate (PET) which has not been subjected to a surface treatment such as a silicon treatment. It should be noted that, in this description, the presence or absence of the "solvent permeability" may be judged, for example, as described below. That is, the inside of a glass bottle (3.5 cm in diameter by 7.5 cm in height) containing 10 g of a solvent is purged with nitrogen, the opening of the glass bottle is sealed with a support backing, and then the glass bottle containing the solvent is heated on a hot plate at ((the boiling point of the solvent)-(35 to 45))° C. for 2 hours. In this case, when no condensation occurs in the inside of the glass bottle and/or the support backing, the support backing is judged to have "solvent permeability" with respect to the solvent.

The storage elastic modulus at 90° C. of the support backing is preferably $1.0 \times 10^7$ Pa or more, more preferably $1.0 \times 10^7$ Pa to $1.0 \times 10^{10}$ Pa. When the storage elastic modulus falls within such range, the applied layer can be held satisfactorily, and a transparent substrate having no unevenness in external appearance can be obtained.

The thickness of the support backing is preferably 25 μm to 120 μm, more preferably 50 μm to 100 μm. When the thickness falls within such range, the applied layer can be held satisfactorily, and a transparent substrate having no unevenness in external appearance can be obtained.

The thermoplastic resin (A) composition solution contains a thermoplastic resin (A) and a solvent.

Examples of the thermoplastic resin (A) include a polyethersulfone-based resin, a polycarbonate-based resin, an epoxy-based resin, an acrylic resin, a polyester-based resin such as polyethylene terephthalate or polyethylene naphthalate, a polyolefin-based resin, a cycloolefin-based resin such as a norbornene-based resin, a polyimide-based resin, a polyamide-based resin, a polyimide amide-based resin, a polyarylate-based resin, a polysulfone-based resin, and a polyether imide-based resin.

The glass transition temperature of the thermoplastic resin (A) is preferably 150° C. to 350° C., more preferably 170° C. to 330° C., particularly preferably 190° C. to 300° C.

Any appropriate solvent may be adopted as the solvent to be contained in the thermoplastic resin (A) composition solution as long as it can dissolve the thermoplastic resin (A).

Examples of the solvent include: aromatic solvents such as toluene and xylene; ketone-based solvents such as cyclopentanone and methyl isobutyl ketone; ether-based solvents such as tetrahydrofuran and propylene glycol methyl ether; and halogen-based solvents such as dichloromethane and trichloroethane. Those solvents may be used alone or in combination.

The concentration of the thermoplastic resin (A) in the thermoplastic resin (A) composition solution may be set to any appropriate concentration as long as application work can be carried out satisfactorily.

As a method of applying the thermoplastic resin (A) composition solution onto the support backing, there are given, for example: coating methods, e.g., air doctor coating, blade coating, knife coating, reverse coating, transfer roll coating, gravure roll coating, kiss coating, cast coating, spray coating, slot orifice coating, calender coating, electrocoating, dip coating, and die coating; and printing methods, e.g. relief printing methods such as flexographic printing, intaglio printing methods such as a direct gravure printing method and an offset gravure printing method, litho printing methods such as an offset printing method, and stencil printing methods such as a screen printing method.

The thickness of the applied layer in the step A is preferably 15 μm to 40 μm, more preferably 20 μm to 30 μm.

The amount of the solvent in the applied layer when the applied layer is formed (i.e., the amount of the solvent in the applied layer in the step A) is preferably 7 wt % or more, more preferably 7 wt % to 50 wt %, particularly preferably 8 wt % to 40 wt %, most preferably 11 wt % to 30 wt %. When the amount of the solvent in the applied layer in the step A is less than 7 wt %, a solvent crack may occur in the applied layer owing to the contact of the solvent in an adhesive composition during a first heat treatment in a downstream step (step C). Further, when the amount of the solvent is more than 50 wt %, the fluidity of the applied layer becomes high, workability upon attaching the applied layer and the inorganic glass to each other may deteriorate in a downstream step (step B).

The amount of the solvent in the applied layer in the step A may be adjusted, for example, by controlling the kind of the solvent and the amount of the solvent in the thermoplastic resin (A) composition solution. Further, as necessary, the amount of the solvent in the applied layer may be adjusted by volatilizing a predetermined amount of the solvent after applying the thermoplastic resin (A) composition solution. In one embodiment, an applied layer having a solvent amount of 7 wt % or more may be formed by placing a support backing having applied thereonto a thermoplastic resin (A) composition solution having a solvent amount of 70 wt % or more at an environmental temperature of 20° C. to 100° C. for 30 seconds to 10 minutes.

B. Step B

The step B is a step of attaching at least one surface of an inorganic glass and the applied layer to each other via an adhesive composition to form a laminate.

Any appropriate inorganic glass may be adopted as the inorganic glass as long as it has a sheet shape. The inorganic glass may be a long continuous flat glass or a piece of a flat glass. According to a classification in terms of composition, examples of the inorganic glass include a soda-lime glass, a borate glass, an aluminosilicate glass, and a quartz glass. Further, according to a classification in terms of alkaline component, examples thereof include a non-alkali glass and a low alkali glass. The content of the alkali metal component (such as $Na_2O$, $K_2O$, or $Li_2O$) in the inorganic glass is preferably 15 wt % or less, more preferably 10 wt % or less.

The thickness of the inorganic glass is preferably 100 μm or less, more preferably 20 μm to 90 μm, particularly preferably 30 μm to 80 μm. In the present invention, a thermoplastic resin layer may be provided on one side or both sides of the inorganic glass to reduce the thickness of the inorganic glass.

The transmittance at a wavelength of 550 nm of the inorganic glass is preferably 85% or more. The refractive index $n_g$ at a wavelength of 550 nm of the inorganic glass is preferably 1.4 to 1.65.

The density of the inorganic glass is preferably 2.3 $g/cm^3$ to 3.0 $g/cm^3$, more preferably 2.3 $g/cm^3$ to 2.7 $g/cm^3$. An inorganic glass having a density within the range provides a transparent substrate having a reduced weight.

Any appropriate molding method may be employed as a molding method for the inorganic glass. Typically, the inorganic glass is produced by melting a mixture including a main raw material such as silica or alumina, an antifoaming agent such as a salt cake or antimony oxide, and a reducing agent such as carbon at a temperature of 1,400° C. to 1,600° C. and molding the resultant into a thin sheet shape, followed by cooling. A molding method for a thin sheet of the inorganic glass is exemplified by a slot down-draw method, a fusion method, and a float method. An inorganic glass molded into a sheet shape by each of those methods may be chemically polished with a solvent such as hydrofluoric acid, as necessary, in order to provide a thinner sheet and enhance smoothness.

A commercially available inorganic glass itself may be used without any treatment as the inorganic glass. Alternatively, a commercially available inorganic glass polished so as to have a desired thickness may also be used. Examples of the commercially available inorganic glass include: "7059," "1737," and "EAGLE2000," manufactured by Corning; "AN100" manufactured by ASAHI GLASS CO., LTD.; "NA-35" manufactured by NH Techno Glass Corporation; "OA-10" manufactured by Nippon Electric Glass Co., Ltd.; and "D263" and "AF45" manufactured by SCHOTT AG.

The inorganic glass is preferably subjected to a coupling treatment on its one surface or both surfaces in advance. When the inorganic glass has been subjected to a coupling treatment in advance, a transparent substrate excellent in adhesiveness between the inorganic glass and the adhesive layer can be obtained. A coupling agent to be used for the coupling treatment is exemplified by an epoxy-terminated coupling agent, an amino group-containing coupling agent, a methacrylic group-containing coupling agent, and a thiol group-containing coupling agent.

The adhesive composition preferably contains a component exhibiting compatibility with the thermoplastic resin (A). The use of such adhesive composition can provide a transparent substrate excellent in adhesiveness between the adhesive layer and the thermoplastic resin layer.

The adhesive composition preferably contains a thermoplastic resin (B) exhibiting compatibility with the thermoplastic resin (A). Specific examples of the thermoplastic resin (B) include a polyethersulfone-based resin, a polycarbonate-based resin, an epoxy-based resin, an acrylic resin, polyester-based resins such as polyethylene terephthalate and polyethylene naphthalate, a polyolefin-based resin, cycloolefin-based resins such as norbornene-based resin, a polyimide-based resin, a polyamide-based resin, a polyimide amide-based resin, a polyarylate-based resin, a polysulfone-based resin, and a polyether imide-based resin. It should be noted that a resin different from the thermoplastic resin (A) is preferably used as the thermoplastic resin (B).

The thermoplastic resin (B) preferably has a highly reactive functional group at a terminal. Examples of the functional group include a hydroxy group, a phenolic hydroxy group, an acrylic group, a methacrylic group, an allyl group, a vinyl group, a thiol group, an alkoxysilyl group, an isocyanate group, an amino group, and a carboxylic acid group. Of those, a phenolic hydroxy group is preferred.

The content of the thermoplastic resin (B) may be set to any appropriate value depending on a desired viscosity of the adhesive composition. The viscosity at 25° C. of the adhesive composition is preferably 0.1 mPa·s to 1,000,000 mPa·s, more preferably 0.2 mPa·s to 500,000 mPa·s, particularly preferably 0.3 mPa·s to 300,000 mPa·s. When the viscosity falls within such range, workability upon attaching the inorganic glass and the applied layer to each other via the adhesive composition is excellent.

The adhesive composition preferably contains a thermosetting monomer and a curing reaction catalyst. When the adhesive composition contains a thermosetting monomer and a curing reaction catalyst, a transparent substrate more excellent in adhesiveness between the inorganic glass and the adhesive layer and between the adhesive layer and the thermoplastic resin layer can be obtained.

Examples of the thermosetting monomer include an epoxy-based monomer, an oxetane-based monomer, an acrylic monomer, and a silicone-based monomer. Those thermosetting monomers may be used alone or in combination. Of those, an epoxy-based monomer or an oxetane-based monomer is preferred. Such thermosetting monomer can form a strong interaction with the thermoplastic resin (B), for example, when the thermoplastic resin (B) has a phenolic hydroxy group, and can provide a transparent substrate more excellent in adhesiveness between the inorganic glass and the adhesive layer and between the adhesive layer and the thermoplastic resin layer.

The content ratio of the thermosetting monomer is preferably 10 wt % to 50 wt %, more preferably 12 wt % to 40 wt %, particularly preferably 15 wt % to 35 wt %, with respect to the thermoplastic resin (B). When the content ratio falls within such range, a less colored transparent substrate more excellent in adhesiveness between the inorganic glass and the adhesive layer and between the adhesive layer and the thermoplastic resin layer can be obtained.

The curing reaction catalyst is preferably an imidazole-based catalyst, a tin-based catalyst, or a titanium-based catalyst. Those catalysts may be used alone or in combination.

Specific examples of the imidazole-based catalyst include 2-methylimidazole, 1,3-dimethylimidazole, 2-ethyl-4-methylimidazole, 2-undecylimidazole, 2-heptadecylimidazole, 2-phenylimidazole, 2-phenyl-4-methylimidazole, 1-benzyl-2-methylimidazole, 1-benzyl-2-phenylimidazole, 1-cyanoethyl-2-methylimidazole, and 1-cyanoethyl-2-ethyl-4-methylimidazole.

Specific examples of the tin-based catalyst include dibutyltin dilaurate, dibutyltin diacetate, dioctyltin dilaurate, and bis(acetoxydibutyltin) oxide.

Specific examples of the titanium-based catalyst include "TA-25" and "TC-750" manufactured by Matsumoto Fine Chemical Co., Ltd.

The content ratio of the curing reaction catalyst is preferably 1 wt % to 10 wt %, more preferably 2 wt % to 8 wt %, particularly preferably 3 wt % to 5 wt %, with respect to the thermoplastic resin (B). When the content ratio falls within such range, a less colored transparent substrate more excellent in adhesiveness between the inorganic glass and the adhesive layer and between the adhesive layer and the thermoplastic resin layer can be obtained.

The adhesive composition preferably contains a solvent. The solvent contained in the adhesive composition preferably exhibits property of dissolving the thermoplastic resin (A) as well. When the adhesive composition contains such solvent, the adhesive composition easily permeates the applied layer. Thus, a transparent substrate excellent in adhesiveness between the adhesive layer and the thermoplastic resin layer can be obtained. The same solvent as the solvent contained in the thermoplastic resin (A) composition solution may be preferably used as the solvent contained in the adhesive composition.

The boiling point of the solvent contained in the adhesive composition is preferably equal to or higher than the boiling point of the solvent contained in the thermoplastic resin (A) composition solution. When the boiling point of the solvent contained in the adhesive composition is equal to or higher than the boiling point of the solvent contained in the thermoplastic resin (A) composition solution, the volatilization of the solvent contained in the adhesive composition during the first heat treatment and the second heat treatment in downstream steps (steps C and D) is hardly inhibited by the solvent contained in the thermoplastic resin (A) composition solution. Hence, the adhesive composition can be prevented from foaming, and a transparent substrate excellent in external appearance can be obtained.

Any appropriate method may be adopted as a method of attaching the inorganic glass and the applied layer to each other via an adhesive composition. Examples of the attaching method include a method involving passing a support backing having formed thereon an applied layer and an inorganic glass between two rolls provided at a certain gap while supplying an adhesive composition therebetween. The adhesive composition to be supplied may be in a solution form or may be in a sheet form.

C. Step C

The step C is a step of subjecting the laminate obtained in the step B to a first heat treatment. The first heat treatment can reduce the amount of the solvent remaining in the applied layer to a predetermined amount. Further, simultaneously, the amount of the solvent in the adhesive composition is also reduced. In addition, when the adhesive composition contains a thermosetting monomer, a curing reaction of the thermosetting monomer proceeds.

Any appropriate method may be adopted as a method for the first heat treatment. Examples of the first heat treatment include heat treatments using an air circulating thermostat oven, heaters utilizing a microwave, far-infrared radiation, and the like, and a roll, a heat pipe roll, a metal belt, and the like heated for temperature control.

The temperature of the first heat treatment is, with respect to the boiling point ($bp_A$) of the solvent contained in the largest amount in the thermoplastic resin (A) composition solution, preferably ($bp_A$−60)° C. to ($bp_A$+40)° C., more preferably ($bp_A$−60)° C. to ($bp_A$+20)° C., particularly preferably ($bp_A$−50)° C. to ($bp_A$+20)° C., most preferably ($bp_A$−45)° C. to ($bp_A$)° C. When the temperature falls within such range, the applied layer and the adhesive composition can be prevented from foaming during the first heat treatment. It should be noted that the temperature may be gradually increased in the first heat treatment.

The time period of the first heat treatment is preferably 1 minute to 30 minutes, more preferably 5 minutes to 20 minutes.

The first heat treatment reduces the amount of the solvent remaining in the applied layer to preferably 15 wt % or less, more preferably 3 wt % to 15 wt %, particularly preferably 4 wt % to 14 wt %, most preferably 5 wt % to 13 wt %. When the amount of the solvent remaining in the applied layer after the first heat treatment is more than 15 wt %, the laminate, which is being conveyed in a downstream step (step D), cannot resist a tension to be applied to the laminate anymore, with the result that the laminate may rupture.

D. Step D

The step D is a step including peeling the support backing from the laminate and subjecting the resultant to a second heat treatment. The second heat treatment can dry the applied layer to form a thermoplastic resin layer. Further, simultaneously, the drying and/or curing of the adhesive composition can be completed to form an adhesive layer.

A shrinkage stress is applied to the applied layer in the laminate because the solvent in the applied layer volatizes through the first heat treatment in the step C. The shrinkage stress of the applied layer upon peeling the support backing is preferably 10 MPa or less, more preferably 8 MPa or less. When the shrinkage stress falls within such range, a wrinkle can be prevented from occurring in the substrate. It should be noted that, when a wrinkle occurs in the substrate, the wrinkle is transferred to the applied layer, and hence a transparent substrate having an unfavorable external appearance may be obtained.

The same method as the method for the first heat treatment may be adopted as a method for the second heat treatment.

The temperature of the second heat treatment is, with respect to the boiling point ($bp_A$) of the solvent contained in the largest amount in the thermoplastic resin (A) composition solution, preferably ($bp_A$−20)° C. to 250° C., more preferably ($bp_A$−10)° C. to 200° C., particularly preferably ($bp_A$)° C. to 180° C. The time period of the second heat treatment may be set to the same time period as the time period of the first heat treatment.

The shrinkage stress of the thermoplastic resin layer obtained by drying the applied layer can be applied to the inorganic glass by carrying out the second heat treatment. A transparent substrate having the inorganic glass to which the stress has been applied as described above is excellent in bending property, flexibility, and impact resistance.

A stress to be applied to the inorganic glass after the second heat treatment (i.e., a stress to be applied to the inorganic glass of the transparent substrate obtained by the manufacturing method of the present invention) is preferably 10 MPa to 30 MPa, more preferably 12 MPa to 30 MPa, particularly preferably 15 MPa to 30 MPa. When the stress falls within such range, sufficient adhesiveness between the inorganic glass and the adhesive layer is obtained, and a transparent substrate excellent in bending property, flexibility, and impact resistance can be obtained. In more detail, the rupture of the inorganic glass occurs owing to such a phenomenon that a tensile stress is concentrated at a crack when the inorganic glass receives an external force in a tensile direction. In this regard, a stress due to the shrinkage of the applied layer and the adhesive layer is applied to the inorganic glass of the transparent substrate obtained by the manufacturing method of the present invention, and hence a tensile stress received by a crack is reduced. As a result, the progress of cracking and rupture of the inorganic glass can be prevented for a larger external force in a tensile direction as well, and a transparent substrate excellent in bending property, flexibility, and impact resistance can be obtained.

E. Transparent Substrate

Figure 3:
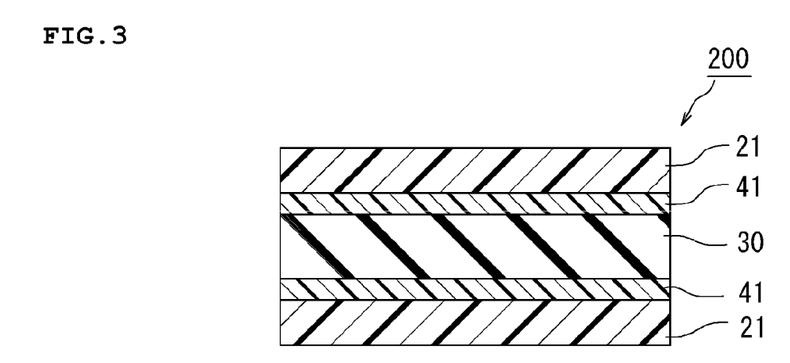
FIG. 3 A schematic cross-sectional view of a transparent substrate obtained by a manufacturing method of the present invention.

FIG. 3 is a schematic cross-sectional view of a transparent substrate obtained by the manufacturing method of the present invention. A transparent substrate 200 includes an inorganic glass 30 and a thermoplastic resin layer 21 disposed on one side or each of both sides (preferably both sides like an example illustrated in the figure) of the inorganic glass 30, and further includes an adhesive layer 41 between the inorganic glass 30 and the thermoplastic resin layer 21.

The transparent substrate of the present invention may include, as necessary, any appropriate additional layer on the thermoplastic resin layer on the opposite side to the inorganic glass. Examples of the additional layer include a transparent conductive layer and a hard coat layer.

The total thickness of the transparent substrate is preferably 150 μm or less, more preferably 140 μm or less, particularly preferably 80 μm to 130 μm.

A rupture diameter in the case of making a crack in the transparent substrate, followed by bending, is preferably 40 mm or less, more preferably 30 mm or less.

The light transmittance at a wavelength of 550 nm of the transparent substrate is preferably 80% or more, more preferably 85% or more. The decrease ratio of the light transmittance of the transparent substrate after subjected to a heating treatment at 180° C. for 2 hours is preferably 5% or less. This is because such decrease ratio allows a practically acceptable light transmittance to be ensured even in the case of carrying out a heating treatment necessary in a manufacturing process for an FPD.

The surface roughness Ra (substantially, the surface roughness Ra of the thermoplastic resin layer or the additional layer) of the transparent substrate is preferably 50 nm or less, more preferably 30 nm or less, particularly preferably 10 nm or less. The undulation of the transparent substrate is preferably 0.5 μm or less, more preferably 0.1 μm or less.

The coefficient of linear expansion of the transparent substrate is preferably 15 ppm/° C. or less, more preferably 10 ppm/° C. or less, particularly preferably 1 ppm/° C. to 10 ppm/° C. The transparent substrate includes the inorganic glass, and thus exhibits excellent dimensional stability (e.g., a coefficient of linear expansion within the above-mentioned range). More specifically, the dimensional variation of the thermoplastic resin layer can also be suppressed by the restraint of the thermoplastic resin layer by the inorganic glass in addition to the rigidity of the inorganic glass itself. As a result, the transparent substrate exhibits excellent dimensional stability as a whole.

The light transmittance at a wavelength of 550 nm of the thermoplastic resin layer is preferably 80% or more. The refractive index ($n_r$) at a wavelength of 550 nm of the thermoplastic resin layer is preferably 1.3 to 1.7.

The thickness of the thermoplastic resin layer is preferably 5 μm to 80 μm, more preferably 8 μm to 60 μm, particularly preferably 10 μm to 50 μm. When the thickness falls within such range, the thermoplastic resin layer can sufficiently reinforce the inorganic glass.

The elastic modulus of the thermoplastic resin layer is preferably 1.5 GPa to 10 GPa or more, more preferably 1.8 GPa to 9 GPa, particularly preferably 2 GPa to 8 GPa.

The fracture toughness value of the thermoplastic resin layer is preferably 1.5 MPa·m$^{1/2}$ to 10 MPa·m$^{1/2}$, more preferably 2 MPa·m$^{1/2}$ to 6 MPa·m$^{1/2}$, particularly preferably 2.5 MPa·m$^{1/2}$ to 8 MPa·m$^{1/2}$. When the fracture toughness value falls within such range, a thermoplastic resin layer having sufficient tenacity is formed, the thermoplastic resin layer prevents the progress of cracking and rupture of an inorganic glass, and a transparent substrate having satisfactory bending property can be obtained. Further, when such thermoplastic resin layer containing a thermoplastic resin (A) is formed on both surfaces of an inorganic glass, even if the inorganic glass ruptures inside the transparent substrate, the thermoplastic resin layer hardly ruptures, and hence the thermoplastic resin layer prevents the inorganic glass from being scattered and keeps the shape of a transparent substrate, which makes it possible to prevent the pollution of facilities in manufacturing steps of a display element and a solar cell and to improve a yield.

The thickness of the adhesive layer is preferably 0.001 μm to 20 μm, more preferably 0.001 μm to 15 μm, particularly preferably 0.01 μm to 10 μm. When the thickness falls within such range, the transparent substrate has a small influence on transparency, and sufficient adhesive strength can be expressed even under a high-temperature and high-humidity condition.

The transparent conductive layer can function as an electrode, an electromagnetic wave shield, or the like when the transparent substrate is used as a substrate for an illumination element, a display element, or a solar cell.

A material that may be used for the transparent conductive layer is exemplified by: a metal such as copper or silver; a metal oxide such as indium tin oxide (ITO) or indium zinc oxide (IZO); a conductive polymer such as polythiophene or polyaniline; and a composition including a carbon nanotube.

The hard coat layer has functions of imparting chemical resistance, mar resistance, and surface smoothness to the transparent substrate.

Any appropriate constituent material may be adopted as a constituent material for the hard coat layer. Examples of the constituent material for the hard coat layer include an epoxy-based resin, an acrylic resin, a silicone-based resin, and a mixture thereof. Of those, an epoxy-based resin excellent in heat resistance is preferred. The hard coat layer may be obtained by curing each of those resins with heat or an active energy ray.

EXAMPLES

Hereinafter, the present invention is described specifically by way of examples. However, the present invention is by no means limited to these examples. It should be noted that a thickness was measured using a digital micrometer "KC-351C type" manufactured by Anritsu Corporation. Further, the solvent permeability of a PET backing used as a support backing in each of Examples and Comparative Examples was judged as described below.

(Solvent Permeability of PET Backing)

10 g of cyclopentanone were loaded into a screw-top vial (manufactured by AS ONE Corporation, model number "No. 7L," product number "5-098011," 3.5 cm in diameter by 7.5 cm in height). After that, the inside of the screw-top vial was purged with nitrogen, and the screw-top vial was sealed with a PET backing measuring 5 cm square. At this time, the screw-top vial and the PET backing were adhered to each other with an adhesive (manufactured by CEMEDINE CO., LTD., product number "AX-083"). Next, the screw-top vial was placed on a hot plate heated to 90° C. and heated for 2 hours. After the completion of the heating, the conditions in the inside of the PET backing and the screw-top vial were visually observed.

As a result of the visual observation, when the condensation of the solvent occurred in the inside of the PET backing and/or the screw-top vial, the PET backing was judged to have no solvent permeability. On the other hand, when the condensation did not occur, the PET backing was judged to have solvent permeability.

Manufacturing Example 1

In a reaction vessel equipped with a stirring device, 7.65 g (0.028 mol) of 4,4'-(1,3-dimethylbutylidene)bisphenol, 12.35 g (0.043 mol) of 4,4'-(1-phenylethylidene)bisphenol, 0.444 g of benzyltriethylammonium chloride, and 0.022 g of p-t-butylphenol were dissolved in 185 g of a 1 M sodium hydroxide solution. To the solution was added in one portion with stirring a solution obtained by dissolving 14.4 g (0.071 mol) of terephthalic acid chloride in 246 g of chloroform, and the mixture was stirred at room temperature for 120 minutes. After that, the polymerization solution was subjected to settled separation to separate a chloroform solution containing a polymer. Next, the chloroform solution was washed with aqueous acetic acid, washed with ion-exchanged water, and then charged into methanol to precipitate the polymer. The precipitated polymer was filtered and dried under reduced pressure to afford 27 g of a white polymer.

Example 1

10 g of polyethersulfone a terminal of which had been modified with a hydroxy group (SUMIKAEXCEL 5003P: manufactured by Sumitomo Chemical Co., Ltd.) were dissolved with heating in 90 g of cyclopentanone to afford a 10 wt % solution. To the resultant solution were added 0.6 g of 3-ethyl-3{[(3-ethyloxetan-3-yl)methoxy]methyl}oxetane (ARON OXETANE OXT-221: manufactured by TOAGOSEI CO., LTD.), 0.4 g of 1,2-dimethylimidazole, and 2.5 g of an epoxy-terminated coupling agent (KBM403: manufactured by Shin-Etsu Chemical Co., Ltd.) to afford an adhesive composition.

Separately, one surface of an inorganic glass (50 μm thick by 10 cm long by 4 cm wide) was washed with methyl ethyl ketone and then subjected to a corona treatment. A 2% aqueous solution of an epoxy coupling agent (KBM403: manufactured by Shin-Etsu Chemical Co., Ltd.) was applied onto the one surface of the inorganic glass and dried at 100° C. for 10 minutes. The same treatments were carried out for the other surface of the inorganic glass as well.

After that, a 10 wt % thermoplastic resin (A) solution obtained by dissolving 10 g of the polymer obtained in Manufacturing Example 1 in 90 g of cyclopentanone was applied onto a PET (Lumirror: manufactured by Toray Industries, Inc., 75 μm thick) substrate having solvent permeability, and the solvent was volatilized at 90° C. for 8 minutes to form an applied layer. The amount of the solvent in the applied layer was 23 wt % (thermoplastic resin (A) concentration: 77 wt %).

The inorganic glass and the applied layer were attached to each other while supplying the adhesive composition between the inorganic glass and the applied layer formed on the PET backing. Such operation was carried out for both surfaces of the inorganic glass to afford a laminate (PET backing/applied layer/adhesive composition/inorganic glass/ adhesive composition/applied layer/PET backing).

The resultant laminate was subjected to a heat treatment at 90° C. for 4 minutes, at 130° C. for 4 minutes, and at 150° C. for 4 minutes. The amount of the solvent remaining in the applied layer after the heat treatment was 6 wt %.

After that, the PET backings on both surfaces were peeled off, and the resultant was further subjected to a heat treatment at 150° C. for 12 minutes to afford a transparent substrate (thermoplastic resin layer (30 μm)/adhesive layer (2.5 μm)/ inorganic glass (50 μm)/adhesive layer (2.5 μm)/thermoplastic resin layer (30 μm)) having a total thickness of 115 μm. It should be noted that the inorganic glass was exposed at the end portions (10 cm long by 1 cm wide) in a widthwise direction of the transparent substrate.

Example 2

A transparent substrate was obtained in the same manner as in Example 1 except that 0.05 g of dibutyltin dilaurate was further added to the adhesive composition.

Comparative Example 1

A transparent substrate was obtained in the same manner as in Example 1 except that the amount of the solvent in the applied layer when the applied layer was formed was changed to 6 wt % (thermoplastic resin layer (A) concentration: 94 wt %).

Comparative Example 2

A transparent substrate was obtained in the same manner as in Example 1 except that a silicon-treated PET (MRF: manufactured by Mitsubishi Plastics, Inc., 38 μm thick) backing having no solvent permeability was used in place of the PET (Lumirror: manufactured by Toray Industries, Inc., 75 μm thick) backing having solvent permeability.

Comparative Example 3

A transparent substrate was obtained in the same manner as in Example 1 except that the PET backings were peeled off immediately after forming the laminate (i.e., prior to the heat treatment).

Comparative Example 4

A casting solution obtained by dissolving 90 g of the polymer obtained in Manufacturing Example 1 in 600 g of cyclopentanone was applied onto a PET (Lumirror: manufactured by Toray Industries, Inc., 75 μm thick) backing and further dried until the remaining solvent amount reached 5% or less. Then, the backing was peeled off to afford a polyarylate film.

Separately, one surface of an inorganic glass (50 μm thick by 10 cm long by 4 cm wide) was washed with methyl ethyl ketone and then subjected to a corona treatment. The one surface of the inorganic glass was treated with an epoxy coupling agent (KBM403: manufactured by Shin-Etsu Chemical Co., Ltd.). The same treatments were carried out for the other surface of the inorganic glass as well.

The polyarylate film was attached to both surfaces of the inorganic glass through the use of an adhesive composition containing g of 3,4-epoxycyclohexenylmethyl-3',4'-epoxycyclohexene carboxylate (Celloxide 2021P: manufactured by DAICEL CHEMICAL INDUSTRIES, LTD.), 2 g of 3-ethyl-3{[(3-ethyloxetan-3-yl)methoxy]methyl}oxetane (ARON OXETANE OXT-221: manufactured by TOAGOSEI CO., LTD.), and 0.4 g of a photopolymerization initiator (SP-170: manufactured by ADEKA CORPORATION). After that, the resultant was irradiated with UV light to cure the adhesive composition, to thereby afford a transparent substrate (polyarylate film layer/adhesive layer/inorganic glass/adhesive layer/polyarylate film layer). It should be noted that the inorganic glass was exposed at the end portions (10 cm long by 1 cm wide) in a widthwise direction of the transparent substrate.

Comparative Example 5

36.2 g of polyethersulfone a terminal of which had been modified with a hydroxy group (SUMIKAEXCEL 5003P: manufactured by Sumitomo Chemical Co., Ltd.) were dissolved in a mixed solvent of 172 g of cyclopentanone and 10.8 g of N,N-dimethylformamide to afford a 16.5 wt % solution of polyethersulfone. To the solution further were added 0.027 g of a leveling agent (BYK 307: manufactured by BYK-Chemie GmbH), 1.81 g of 3,4-epoxycyclohexenylmethyl-3',4'-epoxycyclohexene carboxylate (Celloxide 2021P: manufactured by DAICEL CHEMICAL INDUSTRIES, LTD.), 1.45 g of 3-ethyl-3{[(3-ethyloxetan-3-yl)methoxy]methyl}oxetane (ARON OXETANE OXT-221: manufactured by Toagosei Co., Ltd.), 1.09 g of 2-methylimidazole, and 9.05 g of an epoxy group-terminated coupling agent (KBM-403: manufactured by Shin-Etsu Chemical Co., Ltd.) to afford a first casting solution.

Separately, one surface of an inorganic glass (50 μm thick by 10 cm long by 4 cm wide) was washed with methyl ethyl ketone and then subjected to a corona treatment. The casting solution to which the coupling agent and the like had been added was applied onto the surface, dried at 100° C. for 10 minutes, and further dried heat-treated at 170° C. for 20 minutes to form a first thermoplastic resin layer having a thickness of 1 μm. The same treatments were carried out for the other surface of the inorganic glass as well.

After that, a second casting solution obtained by dissolving 90 g of the polymer obtained in Manufacturing Example 1 in 600 g of cyclopentanone was applied onto the first thermoplastic resin layer and dried at 90° C. for 15 minutes. In addition, the second casting solution was applied onto the first thermoplastic resin layer on the back surface as well and dried at 85° C. for 10 minutes. After that, both the surfaces were dried at 130° C. for 10 minutes and further dried at 170° C. for 20 minutes to afford second thermoplastic resin layer having a thickness on one side of 36.5 μm. Thus, a transparent substrate having a total thickness of 125 μm (second thermoplastic resin layer/first thermoplastic resin layer/inorganic glass/first thermoplastic resin layer/second thermoplastic resin layer) was obtained. It should be noted that the inorganic glass was exposed at the end portions (10 cm long by 1 cm wide) in a widthwise direction of the transparent substrate.

<Evaluation>

Each of the transparent substrates obtained above was evaluated by the following methods. Table 1 shows the results.

(1) Adhesiveness Test

An evaluation was carried out by a cross-cut peeling test according to JIS K 5400. More specifically, 100 cross-cuts were prepared by cross-cutting a square region measuring 10 mm by 10 mm on the surface of one outermost layer of each of the resultant transparent substrates and laminates with a cutter at an interval of 1 mm. A pressure-sensitive adhesive tape was attached onto the cross-cuts and then peeled off. Adhesiveness was evaluated based on the number of resin layer cross-cuts peeled off from the inorganic glass.

(2) External Appearance

The external appearance of each of the resultant transparent substrates was visually observed. A case where none of foaming, cracking, and wrinkling was observed in the transparent substrate was judged to be acceptable (indicated by Symbol "○" in Table 1).

(3) Rupture Diameter (a) The transparent substrates obtained in Examples and Comparative Examples were prepared as samples for evaluation.

(b) A crack measuring 5 mm or less was produced at the center of a longitudinal side of the exposed portion of each thin glass sheet.

(c) The longitudinal side of each sample for evaluation was bent, and the progress of cracking was observed. The diameter of a circle using the bent side (longitudinal side) as its circumference at the time when the glass ruptured was defined as a rupture diameter.

(4) Shrinkage Stress

A resin layer was formed on one surface of a strip of an inorganic glass measuring 30 mm wide by 125 mm long (100 μm thick) by the same method as in Examples and Comparative Examples, and a curled sample was measured for its curvature radius R.

The following parameters were substituted into the Stonry's equation shown below (C. A. Klien, J. Appl. Phys., 88 5487 (2000)) having introduced therein a correction term to determine a shrinkage stress of the resin layer (i.e., a stress to be applied to the inorganic glass): the curvature radius R; the Young's modulus (70 GPa), Poisson's ratio (0.2), and thickness (100 μm) of a thin glass sheet; and the Young's modulus, Poisson' ratio, and thickness of a resin.

$$\sigma = ((1+\chi\delta^3)/(1+\delta))*(E'_s{}^*t_s{}^2/(6*R*t_f)) \sim (1/(1+\delta))*(E'_s{}^*t_s{}^2/(6*R*t_f))$$ [Math. 1]

σ: shrinkage stress (MPa)
$\chi$: $E'_f/E'_s$
$E'_f$: $E_f/(1-\gamma_f)$
$E'_s$: $E_s/(1-\gamma_s)$
$E_f$: Young's modulus of resin (MPa)
$\gamma_f$: Poisson's ratio of resin
$E_s$: Young's modulus of glass (MPa)
$\gamma_s$: Poisson's ratio of glass
$\delta$: $t_f/t_s$
$t_f$: thickness of glass (μm)
$t_s$: thickness of resin layer (μm)
R: curvature radius (μm)

TABLE 1

| | Adhesiveness (number of resin layer cross-cuts peeled off (pieces)) | External appearance | Rupture diameter (mm) | Shrinkage stress (MPa) |
|---|---|---|---|---|
| Example 1 | 0 | ○ | <25 | 25 |
| Example 2 | 0 | ○ | <25 | 25 |
| Comparative Example 1 | 0 | Occurrence of crack | Unmeasurable | |
| Comparative Example 2 | 0 | Foaming | Unmeasurable | |
| Comparative Example 3 | Unmeasurable owing to rupture in step | | | |
| Comparative Example 4 | 0 | ○ | >35 | 0.2 |
| Comparative Example 5 | 0 | Foaming | <25 | 25 |

As apparent from Table 1, each of the transparent substrates of Examples 1 and 2, which was obtained by subjecting a laminate including a support backing, an adhesive composition, and an applied layer containing a predetermined amount of a solvent to a first heat treatment, peeling the support backing, and subjecting the resultant to a second heat treatment, was excellent in adhesiveness, had a resin layer having a large shrinkage stress, and had a small rupture diameter. Those results suggest that the transparent substrates obtained by the manufacturing method of the present invention are excellent in bending property, flexibility, and impact resistance. On the other hand, the transparent substrate of Comparative Example 4 had a resin layer (polyarylate film layer) having a small shrinkage stress. Such transparent substrate is poor in bending property and impact resistance because a sufficient stress is not applied to an inorganic glass.

Further, according to the manufacturing methods of Examples 1 and 2, transparent substrates excellent in external appearance were obtained. On the other hand, a crack occurred in a transparent substrate (Comparative Example 1) obtained by carrying out the first heat treatment in a state in which the amount of the solvent in the applied layer was small. Further, when the PET backings were peeled off immediately after forming the laminate (i.e., prior to the heat treatment), it was impossible to produce a transparent substrate owing to rupture in the step (Comparative Example 3). In addition, when a PET backing having no solvent permeability was used as a support backing (Comparative Example 2) and when a thermoplastic resin layer was formed by a conventional method, i.e., direct application without any support backing, foaming was observed (Comparative Example 5).

INDUSTRIAL APPLICABILITY

The transparent substrate obtained by the manufacturing method of the present invention may be used in a display element, a solar cell, or an illumination element. Examples of the display element include a liquid crystal display, a plasma display, an organic EL display, and electronic paper. The illumination element is, for example, an organic EL element.

REFERENCE SIGNS LIST 10 support backing
20 applied layer
30 inorganic glass
40 adhesive composition
21 thermoplastic resin layer
41 adhesive layer
100, 100' oven
200 transparent substrate

The invention claimed is:

1. A manufacturing method for a transparent substrate, comprising:
    a step A of applying a thermoplastic resin (A) composition solution onto a support backing having solvent permeability to form an applied layer; wherein the thermoplastic resin (A) composition solution comprises a solvent and a thermoplastic resin (A); then
    a step B of attaching at least one surface of an inorganic glass and the applied layer to each other via an adhesive composition to form a laminate; then
    a step C of subjecting the laminate to a first heat treatment to reduce an amount of the solvent to a predetermined amount; and then
    a step D of peeling the support backing from the laminate and then subjecting the resultant to a second heat treatment to dry the applied layer, thereby forming a thermoplastic resin layer,
    wherein the adhesive composition comprises a solvent, and the solvent in the adhesive composition exhibits the property of dissolving thermoplastic resin (A) contained in the thermoplastic resin (A) composition solution.

2. A manufacturing method for a transparent substrate according to claim 1, wherein the amount of the solvent after step A but before step B is 7 wt % or more.

3. A manufacturing method for a transparent substrate according to claim 1, wherein the first heat treatment reduces the amount of the solvent to 15 wt % or less.

4. A manufacturing method for a transparent substrate according to claim 1, wherein a shrinkage stress of the applied layer upon peeling the support backing is 10 MPa or less.

5. A manufacturing method for a transparent substrate according to claim 1, wherein a stress to be applied to the inorganic glass after the second heat treatment is 10 MPa to 30 MPa.

6. A manufacturing method for a transparent substrate according to claim 1, wherein a temperature of the first heat treatment is, with respect to a boiling point ($bp_A$) of the solvent contained in a largest amount in the thermoplastic resin (A) composition solution, ($bp_A$−60°) C. to ($bp_A$+40°) C.

7. A manufacturing method for a transparent substrate according to claim 1, wherein a temperature of the second heat treatment is, with respect to a boiling point ($bp_A$) of the solvent contained in a largest amount in the thermoplastic resin (A) composition solution, ($bp_A$−20°) C. to 250° C.

8. A manufacturing method for a transparent substrate according to claim 1, wherein the adhesive composition comprises a solvent, and a boiling point of the solvent in the adhesive composition is equal to or higher than a boiling point of a solvent contained in the thermoplastic resin (A) composition solution.

9. A manufacturing method for a transparent substrate according to claim 1, wherein the adhesive composition comprises a component exhibiting compatibility with a thermoplastic resin (A) contained in the thermoplastic resin (A) composition solution.

10. A manufacturing method for a transparent substrate according to claim 1, wherein the adhesive composition comprises a solvent, a thermoplastic resin (B) exhibiting compatibility with the thermoplastic resin (A) composition solution, a thermosetting monomer, and a curing reaction catalyst.

11. A manufacturing method for a transparent substrate according to claim 10, wherein the thermoplastic resin (B) has a reaction group at a terminal.

12. A manufacturing method for a transparent substrate according to any one of claims 1 to 8 and 9 to 11, wherein the support backing has a storage elastic modulus at 90° C. of $1.0 \times 10^7$ Pa or more.

13. A manufacturing method for a transparent substrate according to claim 12, wherein a thickness of the inorganic glass is 100 μm or less.

* * * * *